(12) United States Patent
Chandra

(10) Patent No.: US 7,656,899 B2
(45) Date of Patent: Feb. 2, 2010

(54) ACCESS POINTS WITH SELECTIVE COMMUNICATION RATE AND SCHEDULING CONTROL AND RELATED METHODS FOR WIRELESS LOCAL AREA NETWORKS (WLANS)

(75) Inventor: Arty Chandra, Manhasset Hills, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 729 days.

(21) Appl. No.: 10/933,008

(22) Filed: Sep. 2, 2004

(65) Prior Publication Data

US 2005/0099979 A1    May 12, 2005

Related U.S. Application Data

(60) Provisional application No. 60/525,963, filed on Dec. 1, 2003, provisional application No. 60/517,833, filed on Nov. 6, 2003.

(51) Int. Cl.
*H04J 3/16* (2006.01)

(52) U.S. Cl. .................. 370/468; 370/345; 370/338; 455/450; 455/561

(58) Field of Classification Search ......... 370/230–235, 370/412, 338, 348, 345, 310–350, 468; 455/450, 455/461
See application file for complete search history.

(56) References Cited

U.S. PATENT DOCUMENTS

| | | | |
|---|---|---|---|
| 5,859,835 A * | 1/1999 | Varma et al. ............... 370/229 |
| 6,198,723 B1 | 3/2001 | Parruck et al. |
| 6,567,416 B1 | 5/2003 | Chuah |
| 6,714,554 B1 | 3/2004 | Jin et al. |
| 6,762,994 B1 | 7/2004 | Mitchell et al. |
| 6,888,842 B1 | 5/2005 | Kirby et al. |
| 6,920,120 B2 * | 7/2005 | Huang et al. ............... 370/329 |
| 7,406,098 B2 * | 7/2008 | Taneja et al. ............... 370/468 |
| 2002/0097734 A1 * | 7/2002 | Amou et al. ............... 370/412 |
| 2003/0053434 A1 * | 3/2003 | Chow et al. ............... 370/338 |

(Continued)

FOREIGN PATENT DOCUMENTS

EP    1 227 626    7/2002

(Continued)

OTHER PUBLICATIONS

Chao, Guo, "Quality of Service Control in High-Speed Networks," Quality of Service Control in High-Speed Networks, Feb. 12, 2002, pp. 109-130. http://www3.interscience.wiley.com/cgi-bin/booktext/90512011/BOOKPDFSTART.

(Continued)

*Primary Examiner*—Dwayne Bost
*Assistant Examiner*—Amancio Gonzalez
(74) *Attorney, Agent, or Firm*—Volpe and Koenig, P.C.

(57) ABSTRACT

The present invention is directed to methods and wireless communication devices that are configured to enhance communication capacity in a wireless network. In one aspect of the invention various scheduling processes and schedulers for the transmissions of data packets are disclosed. In another aspect of the invention, the selection of appropriate transmission rates to advertise by a common unit which provides wireless service to different types of wireless transmit receive units (WTRUs) is addressed.

18 Claims, 4 Drawing Sheets

U.S. PATENT DOCUMENTS

| | | | |
|---|---|---|---|
| 2003/0081628 A1* | 5/2003 | Sugar et al. | 370/461 |
| 2003/0133427 A1 | 7/2003 | Cimini et al. | |
| 2004/0110508 A1 | 6/2004 | Haartsen | |
| 2004/0199684 A1* | 10/2004 | LeBlanc et al. | 710/52 |
| 2006/0203772 A1 | 9/2006 | Laroia et al. | |
| 2008/0019305 A1 | 1/2008 | Dekorsky et al. | |

FOREIGN PATENT DOCUMENTS

| | | |
|---|---|---|
| EP | 1227626 | 7/2002 |
| JP | 2003-110575 | 4/2003 |
| KR | 1020030080501 | 10/2003 |
| WO | 02/091633 | 11/2002 |

OTHER PUBLICATIONS

Saitoh et al., "An Effective Data Transfer Method by Integrating Priority Control Into Multirate Mechanisms for IEEE 802.11 Wireless LANs." VTC Spring 2002. IEEE 55$^{th}$ Vehicular Technology Conference Proceedings, vol. 1 of 4, May 6, 2002, pp. 55-59.

Heusse et al.,"Performance Anomaly of 802.11b." Infocom 2003, 22$^{nd}$ Annual Joint Conference of the IEEE Computer and Communications Societites, Mar. 30, 2003, pp. 836-843.

* cited by examiner

ACCESS POINTS WITH SELECTIVE COMMUNICATION RATE AND SCHEDULING CONTROL AND RELATED METHODS FOR WIRELESS LOCAL AREA NETWORKS (WLANS)

CROSS REFERENCE TO RELATED APPLICATION(S)

This application claims priority from U.S. Patent Application No. 60/517,833, filed Nov. 6, 2003 and U.S. Patent Application No. 60/525,963, filed Dec. 1, 2003, which are incorporated by reference as if fully set forth.

FIELD OF INVENTION

This application relates to apparatus and methods for wireless communication and in particular the control of data rates and scheduling of wireless communications for wireless local area networks (WLANs), particularly those compliant with one or more of the family of standards known as 802.11.

BACKGROUND OF THE INVENTION

Wireless communication systems are well known in the art. Generally, such systems comprise communication stations, which transmit and receive wireless communication signals between each other. Depending upon the type of system, communication stations typically are one of two types: base stations or wireless transmit/receive units (WTRUs), which include mobile units.

The term base station as used herein includes, but is not limited to, a base station, Node B, site controller, access point or other interfacing device in a wireless environment that provides WTRUs with wireless access to a network with which the base station is associated.

The term WTRU as used herein includes, but is not limited to, a user equipment, mobile station, fixed or mobile subscriber unit, pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units. Generically, base stations are also WTRUs.

Typically, a network of base stations is provided where each base station is capable of conducting concurrent wireless communications with appropriately configured WTRUs. Some WTRUs are configured to conduct wireless communications directly between each other, i.e., without being relayed through a network via a base station. This is commonly called peer-to-peer wireless communications. Where a WTRU is configured to communicate with other WTRUs it may itself be configured as and function as a base station. WTRUs can be configured for use in multiple networks with both network and peer-to-peer communications capabilities.

One type of wireless system, called a wireless local area network (WLAN), can be configured to conduct wireless communications with WTRUs equipped with WLAN modems that are also able to conduct peer-to-peer communications with similarly equipped WTRUs. Currently, WLAN modems are being integrated into many traditional communicating and computing devices by manufacturers. For example, cellular phones, personal digital assistants, and laptop computers are being built with one or more WLAN modems.

A popular wireless local area network environment with one or more WLAN base stations, typically called access points (APs), is built according to the IEEE 802.11b standard. Access to these networks usually requires user authentication procedures. Protocols for such systems are presently being standardized in the WLAN technology area. One such framework of protocols is the IEEE 802 family of standards.

The basic service set (BSS) is the basic building block of an IEEE 802.11 WLAN and this consists of WTRUs typically referred to as stations (STAs). Basically, the set of STAs which can talk to each other can form a BSS. Multiple BSSs are interconnected through an architectural component, called a distribution system (DS), to form an extended service set (ESS). An access point (AP) is a station (STA) that provides access to the DS by providing DS services and generally allows concurrent access to the DS by multiple STAs.

The 802.11 standards allow multiple transmission rates (and dynamic switching between rates) to be used to optimize throughput. The lower rates have more robust modulation characteristics that allow greater range and/or better operation in noisy environments than the higher rates. The higher rates provide better throughput. It is an optimization challenge to always select the best (highest) possible rate for any given coverage and interference condition.

The currently specified rates of various versions of the 802.11 standard are set forth in Table 1 as follows:

TABLE 1

802.11 Standard Data Rates

| Standard | Supported Rates (Mbps) |
|---|---|
| 802.11 (original) | 1, 2 |
| 802.11a | 6, 9, 12, 18, 24, 36, 48, 54 |
| 802.11b | 1, 2, 5.5, 11 |
| 802.11g | 1, 2, 5.5, 6, 9, 11, 12, 18, 24, 36, 48, 54 |

For 802.11g, the rates 6, 9, 12, 18, 24, 36, 48 and 54 Mbps use orthogonal frequency division modulation (OFDM). The choice of the rate can affect performance in terms of system and user throughput, range and fairness.

Conventionally, each 802.11 device has a Rate Control algorithm implemented in it that is controlled solely by that device. Specifically, uplink (UL) Rate Control in STAs and down link (DL) Rate Control in APs. The algorithm for rate switching is not specified by the standards. It is left up to the STA (and AP) implementation.

The inventors have recognized that each STA typically gets equal opportunity to send packet data. However, a packet sent at a lower rate takes much longer than one sent at higher rate and where a WLAN has a single shared channel, the lowest data rate will cause the capacity of the AP with which the STAs are communicating to be reduced.

Also, APs often must handle communications for multiple STAs. This presents a scheduling issue for the downlink transmissions for data to the various STAs. The inventors have recognized that data queues may be advantageously used by the APs based of on class of service in combination with the use of a priority system for releasing data from the respective queues for transmission.

In some instances, APs are configured to provide wireless services to more than one type of STA. For example, devices compliant to the IEEE 802.11g standard have become available. These devices operate in the same channels as existing 802.11b devices, but operate at a higher throughput rate. Systems operating under the 802.11g standard are preferably configured such that both 802.11b and 802.11g STAs can communicate with an 802.11g AP, in order to allow coexistence with legacy 802.11b systems.

As noted above, all 802.11 systems permit a choice of transmission rates for radio transmissions, but the rate to choose for a transmission is implementation dependent. The obvious solution is to choose the rate that maximizes throughput for a particular transmission. This implies that for the same signal strength and interference levels, 802.11g OFDM rates would always be chosen over 802.11b rates, assuming equivalent receiver performance. However, as discussed below, the inventors have recognized that this does not ensure fair access to the available bandwidth for 802.11b devices. It is thus advantageous to provide transmission rates which take into account the distinctions in the operating characteristics of 802.11b and 802.11g devices to more fairly allocate transmission rates among the 802.11b and 802.11g devices.

SUMMARY

The present invention is directed to methods and wireless communication devices that are configured to enhance communication capacity in a wireless network. In one aspect of the invention various scheduling processes and schedulers for the transmissions of data packets are disclosed. In another aspect of the invention, the selection of appropriate transmission rates to advertise by a common unit which provides wireless service to different types of wireless transmit receive units (WTRUs) is addressed.

In one embodiment, a WTRU is provided for conducting wireless communications with a plurality of other WTRUs that implements a process for controlling transmission of wireless communication data to the other WTRUs. The WTRU has a scheduler configured to queue data packets for transmission to other WTRUs based on transmission rate. The scheduler selectively enables transmission of queued data packets from transmission rate assigned queues in successive turns based on an allocated time period for each queue turn such that a shortest time period is allocated for data packets queued in a lowest data rate queue and a longest time period is allocated for data packets queued in a highest data rate queue. Preferably, the scheduler is configured to allocate a time period for a given queue that is at least as long as the time period allocated for each queue assigned for data packets designated for transmission at a lower data rate than the data rate assigned to the given queue. Such a WTRU is advantageously configured as an Access Point (AP) for a 802.11 wireless local area network (WLAN).

Broadly, the WTRU's scheduler can be configured to selectively enable communication of data packets with other WTRUs in successive turns based on an allocated time period for each turn such that a shortest time period is allocated for data packets communicated at a lowest data rate and a longest time period is allocated for data packets communicated at a highest data rate. Preferably, the scheduler is configured to allocate time periods for receiving data packets from other WTRUs such that each other WTRU is provided a transmission time for its respective turn based upon the transmission rate at which that WTRU is to transmit data packets that is at least as long as the time period allocated for data packets designated for transmission at a lower data rate than the transmission rate at which that WTRU is to transmit data packets. In addition, the scheduler can be configured to queue data packets for transmission to other WTRUs based on transmission rate and to selectively enable transmission of queued data packets from transmission rate assigned queues in successive turns based on an allocated time period for each queue turn such that a shortest time period is allocated for data packets queued in a lowest data rate queue and a longest time period is allocated for data packets queued in a highest data rate queue. In such case, the scheduler is preferably configured to allocate a time period for a given queue that is at least as long as the time period allocated for each queue assigned for data packets designated for transmission at a lower data rate than the data rate assigned to the given queue. Such a WTRU is advantageously configured as an Access Point (AP) for a 802.11 wireless local area network (WLAN).

Corresponding methods are provided for conducting wireless communication of data between a wireless transmit/receive unit (WTRU) and a plurality of other WTRUs and for controlling transmission of such communication data to the other WTRUs. Data packets are queued for transmission to other WTRUs based on transmission rate. The transmission of queued data packets from transmission rate assigned queues is selectively enabled in successive turns based on an allocated time period for each queue turn such that a shortest time period is allocated for data packets queued in a lowest data rate queue and a longest time period is allocated for data packets queued in a highest data rate queue. Preferably, a time period is allocated for a given queue that is at least as long as the time period allocated for each queue assigned for data packets designated for transmission at a lower data rate than the data rate assigned to the given queue.

Broadly, the method entails selectively enabling communication of data packets with other WTRUs in successive turns based on an allocated time period for each turn such that a shortest time period is allocated for data packets communicated at a lowest data rate and a longest time period is allocated for data packets communicated at a highest data rate. Preferably, time periods are allocated for receiving data packets from other WTRUs such that each other WTRU is provided a transmission time for its respective turn based upon the transmission rate at which that WTRU is to transmit data packets that is at least as long as the time period allocated for data packets designated for transmission at a lower data rate than the transmission rate at which that WTRU is to transmit data packets. Additionally, data packets can be queued for transmission to other WTRUs based on transmission rate and then the transmission of queued data packets is selectively enabled from transmission rate assigned queues in successive turns based on an allocated time period for each queue turn such that a shortest time period is allocated for data packets queued in a lowest data rate queue and a longest time period is allocated for data packets queued in a highest data rate queue. In such a case, a time period is preferably allocated for a given queue that is at least as long as the time period allocated for each queue assigned for data packets designated for transmission at a lower data rate than the data rate assigned to the given queue.

In another embodiment, the WTRU's scheduler is configured to queue data packets for transmission to other WTRUs based on selected criteria. A queue arrival time is identified with each queued data packet whereby in each queue in which data packets are queued, a data packet is disposed at a head of the queue that has an identified earliest queue arrival time relative to the queue arrival time identified with other data packets in the same queue. Preferably, the scheduler is further configured to selectively enable transmission of queued data packets by removing a data packet for transmission processing from the head of one of the queues based on a priority index calculated for each data packet concurrently disposed at the head of one of the queues. The scheduler is preferably configured to calculate the priority index of a data packet using the queue arrival time identified with the data packet and a data transmission rate associated with the data packet.

In one variation of such an embodiment, the scheduler is configured to queue data packets based on data transmission rate identified with each data packet such that data packet queues are defined for different data rates. Where there are defined classes of service for data transmission, each identified with a data transmission rate, the scheduler is preferably configured to queue data packets based on class of service identified with each data packet such that data packet queues are defined for each class of service.

In another variation of such an embodiment, the scheduler is configured to queue data packets based on a destination WTRU identified with each data packet such that a data packet queue is defined for each different destination WTRU. In either case, the WTRU is advantageously configured as an Access Point (AP) for a 802.11 wireless local area network (WLAN).

In implementation, the WTRU can include a memory device and an associated processor. The memory device is preferably configured with selectively defined data packet transmission queues based on selected data packet characteristics. The processor is preferably configured to associate a queue arrival time with successive data packets received for transmission queuing and to store each data packet in connection with its queue arrival time in a respective queue based on the selected data packet characteristics. As a result, in each queue in which data packets are stored, a data packet is disposed at a head of the queue that has an identified earliest queue arrival time relative to the queue arrival time identified with other data packets in the same queue. The processor is also preferably configured to selectively enable transmission of queued data packets by removing a data packet for transmission processing from the head of one of the queues based on a priority index calculated for each data packet concurrently disposed at the head of one of the queues. In such a case, the processor is preferably configured to calculate the priority index of a data packet using the queue arrival time identified with the data packet and a data transmission rate associated with the data packet.

In one variation of such an embodiment, the memory device is configured such that data packet queues are defined for different data rates and the processor is configured to store data packets in respective queues based on a data transmission rate identified with each data packet. Where there are defined classes of service for data transmission, each identified with a data transmission rate, the processor is preferably configured to queue data packets based on class of service identified with each data packet such that data packet queues are defined in the memory device for each class of service.

In another variation of such an embodiment, the memory device is configured such that data packet queues are defined for different destination WTRUs and the processor is configured to store data packets in respective queues based on a destination WTRU identified with each data packet. In either case, the WTRU is advantageously configured as an Access Point (AP) for a 802.11 wireless local area network (WLAN).

A corresponding method is provided that includes queuing data packets for transmission to other WTRUs based on selected criteria such that a queue arrival time is identified with each queued data packet. As a result, in each queue in which data packets are queued, a data packet is disposed at a head of the queue that has an identified earliest queue arrival time relative to the queue arrival time identified with other data packets in the same queue. Transmission of queued data packets is then selectively enabled by removing a data packet for transmission processing from the head of one of the queues based on a priority index calculated for each data packet concurrently disposed at the head of one of the queues. Preferably, the calculating of the priority index of a data packet uses the queue arrival time identified with the data packet and a data transmission rate associated with the data packet.

In another variation of such a method, data packets are queued based on data transmission rate identified with each data packet such that data packet queues are defined for different data rates. Where steps are performed by an Access Point (AP) for a 802.11 wireless local area network (WLAN) that has classes of service for data transmission, each identified with a data transmission rate, data packets are preferably queued based on class of service identified with each data packet such that data packet queues are defined for each class of service.

In another variation of such an embodiment, data packets are queued based on a destination WTRU identified with each data packet such that a data packet queue is defined for each different destination WTRU. Such a method is advantageously performed by an Access Point (AP) for a 802.11 wireless local area network (WLAN).

In another aspect of the invention, a method is provided for a wireless transmit/receive unit (WTRU) to conduct wireless communications with a plurality of other WTRUs that implements a process for advertising available wireless communication data rates to the other WTRUs where the other WTRUs include a first type of WTRU capable of communicating at data rates in a first defined set of rates and a second type of WTRU capable of communicating at data rates in a second defined set of rates that include first type data rates that are useable by both the first and second types of WTRUs and second type data rates that are useable by the second type of WTRUs, but not the first type of WTRUs. A number m of the first type of WTRUs and a number n of the second type of WTRUs wirelessly communicating with the rate advertising WTRU are determined. A quality of a radio link between the rate advertising WTRU and the first and second types of WTRUs with which it is communicating is also determined. Then support of the second defined set of data rates is advertised when m=0 or when the determined radio link quality lies at a desired level and n=0. The method can additionally include the determining of a quality of a radio link includes determining of a frame error rate (FER) such that a desired level of link quality is determined when the FER is below a predetermined threshold.

In addition or in the alternative, the method may include advertising support of the second defined set of data rates when m≠0, n≠0 and all of the second type of WTRUs are communicating with the rate advertising WTRU at second type data rates that are not useable by the first type of WTRUs. Such methods are advantageously performed by an Access Point (AP) for a wireless local area network (WLAN) that is configured for communicating with 1, 2, 5.5, 6, 9, 11, 12, 18, 24, 36, 48 and 54 Mbps data rates where the first defined set of rates includes 1, 2, 5.5 and 11 Mbps data rates and the second defined set of rates includes 1, 2, 5.5, 6, 9, 11, 12, 18, 24, 36, 48 and 54 Mbps data rates. In such a case, the first type of data rates that are usable by the first and second types of WTRUs include 1, 2, 5.5 and 11 Mbps the second type of data rates that are not usable by the first type of WTRUs include 6, 9, 12, 18, 24, 36, 48 and 54 Mbps. In such a case, the advertising support of the second defined set of data rates is preferably performed when all of the second type of WTRUs that are communicating with the AP are communicating at data rates greater than 11 Mbps.

In addition or in the alternative, the method may also include advertising support of the second defined set of data rates when m≠0, at least one of the second type of WTRUs is communicating with the rate advertising WTRU at a first type data rate and m/n is greater than or equal to a predetermined WTRU ratio threshold. As a further addition or alternative, the method may also include advertising support of the first type of data rates and not the second type of data rates when m≠0, at least one of the second type of WTRUs is communicating with the rate advertising WTRU at a first type data rate and m/n is less than a predetermined WTRU ratio threshold. Preferably, the advertising support of the first type of data rates and not the second type of data rates includes advertising support of the first defined set of data rates and communications on unadvertised rates is disabled in the rate advertising WTRU.

For implementation, a rate advertising WTRU is preferably provided that is configured to conduct wireless communications with a plurality of other WTRUs and to advertise available wireless communication data rates to the other WTRUs where the other WTRUs include a first type of WTRU capable of communicating at data rates in a first defined set of rates and a second type of WTRU capable of communicating at data rates in a second defined set of rates that include first type data rates that are useable by both the first and second types of WTRUs and second type data rates that are useable by the second type of WTRUs, but not the first type of WTRUs. Preferably, such a WTRU has a receiving unit, a signal processing unit and a transmitting unit. The receiving unit is preferably configured to determine a number m of the first type of WTRUs and a number n of the second type of WTRUs wirelessly communicating with the rate advertising WTRU. The signal processing unit is preferably configured to determine a quality of a radio link between the rate advertising WTRU and the first and second types of WTRUs with which it is communicating. The transmitting unit is preferably configured to advertise support of the second defined set of data rates when m=0 or when the determined radio link quality lies at a desired level and n=0. The signal processing unit can be configured to determine a quality of a radio link by determining of a frame error rate (FER) such that a desired level of link quality is determined when the FER is below a predetermined threshold.

As an alternative or in addition, the transmitting unit can be configured to advertise support of the second defined set of data rates when m≠0, n≠0 and all of the second type of WTRUs are communicating with the rate advertising WTRU at second type data rates that are not useable by the first type of WTRUs.

Such WTRUs are advantageously configured to communicate at 1, 2, 5.5, 6, 9, 11, 12, 18, 24, 36, 48 and 54 Mbps data rates as an Access Point (AP) for a wireless local area network (WLAN) where the first defined set of rates includes 1, 2, 5.5 and 11 Mbps data rates and the second defined set of rates includes 1, 2, 5.5, 6, 9, 11, 12, 18, 24, 36, 48 and 54 Mbps data rates where the first type of data rates that are usable by the first and second types of WTRUs include 1, 2, 5.5 and 11 Mbps the second type of data rates that are not usable by the first type of WTRUs include 6, 9, 12, 18, 24, 36, 48 and 54 Mbps. In such case, the transmitting unit is preferably configured to advertise support of the second defined set of data rates when all of the second type of WTRUs that are communicating with the WTRU are communicating at data rates greater than 11 Mbps.

As a further alternative or addition, the transmitting unit can be configured to advertise support of the second defined set of data rates when m≠0, at least one of the second type of WTRUs is communicating with the rate advertising WTRU at a first type data rate and m/n is greater than or equal to a predetermined WTRU ratio threshold. Also, the transmitting unit can be configured to advertise support of the first type of data rates and not the second type of data rates when m≠0, at least one of the second type of WTRUs is communicating with the rate advertising WTRU at a first type data rate and m/n is less than a predetermined WTRU ratio threshold. In such case, the transmitting unit is preferably configured to advertise support of the first defined set of data rates and to disable communications on unadvertised rates when m≠0, at least one of the second type of WTRUs is communicating with the rate advertising WTRU at a first type data rate and m/n is less than the predetermined WTRU ratio.

Other objects and advantages of the present invention will be apparent to persons skilled in the art from the following description and accompanying drawings.

DETAILED DESCRIPTION OF THE PREFERRED EMBODIMENTS

Figure 1:
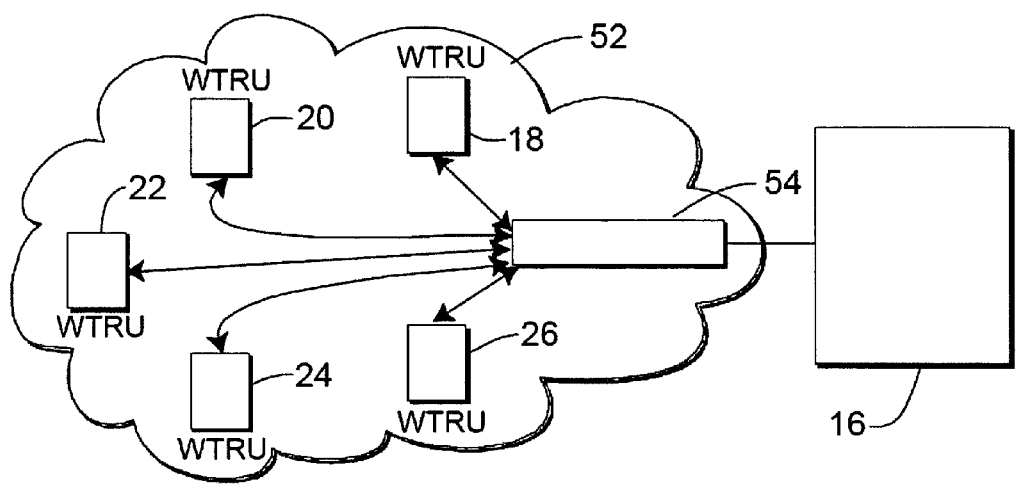
FIG. 1 is a system overview diagram illustrating WLAN communication.

The present invention is described with reference to the drawing figures wherein like numerals represent like elements throughout. The terms base station, Access Point (AP), Station (STA), WTRU, and mobile unit are used in their general sense as described above. The present invention provides a wireless radio access network having one or more networked base stations through which wireless access service is provided for WTRUs. The invention is particularly useful when used in conjunction with mobile units or mobile STAs, as they enter and/or travel through the respective areas of geographic coverage provided by respective base stations or other APs.

In accordance with the invention, WTRUs can be configured with a peer-to-peer mode of operation, preferably, by being equipped with wireless local area network (WLAN) modems to exchange information directly between similarly equipped WTRUs. The WTRUs can have an integrated or installed wireless WLAN device, such as 802.11(b), 802.11 (g), WiFi or Bluetooth compliant device, in order to communicate with each other. However, the proposed invention is applicable in any wireless system.

Referring to FIG. 1, a WLAN is illustrated where WTRUs conduct wireless communications via an Access Point (AP) 54 which can be connected with other network infrastructure such as a Network Management Station (NMS) 16. The AP 54 is shown as conducting communications with WTRU 18, WTRU 20, WTRU 22, WTRU 24, and WTRU 26. The communications are coordinated and synchronized through the AP 54. Such a configuration is also called a basic service set (BSS) within WLAN contexts.

Generally, the WLAN system supports WTRUs with different data rates. In some cases an AP is configured to support multiple types of WTRUs, such as 802.11(b) compliant WTRUs as well as 802.11(g) compliant WTRUs. In such a case the data rates available to the 802.11(g) compliant WTRUs are more numerous as reflected in the rate chart above.

Where the AP 54 is configured to support one type of WTRU, such as only 802.11(a) compliant WTRUs, each WTRU gets an equal opportunity to send communications such as packet data, but the rate used may be different and can depend on a variety of factors which are typically related to the quality of service (QoS) of the particular WTRU-AP communication. A data packet sent at a lower rate takes much longer than one sent at a higher rate. For a WLAN having a single shared channel for such packet data, the lowest data rate used for communicating a data packet controls and causes a limitation to the capacity of the AP.

According to the teachings of the present invention, the AP preferably schedules packet data based on the time it takes to send the packet. Using as limits the maximum allowed time in queue and required delay QoS for the particular service, the amount of time allocated for various rates is selectively decided in order to optimize the capacity of the network. To do this, the AP preferably schedules the data packets for different STAs based on the time it takes to send packets of a certain size, not on the number of packets sent. In order to optimize the overall AP capacity/throughput, more time is allocated to higher data rate services and less time to lower rate services. Accordingly, this solves a current problem of lower overall AP throughput due to single low rate device.

For example, with reference to FIG. 1, the WTRUs and AP 54 can be configured to operate under the 802.11(a) standard. The AP would then decide how to permit packets to be sent for the following relative times dependent on rate as reflected in Table 2, where $T_1$ represents the shortest maximum time interval for the slowest rate which in the case of 802.11a is currently 6 Mpbs.

TABLE 2

Example of Packet Data Time Allocation Per Rate For A 802.11a System

| | Rate (Mbps) | | | | | | |
|---|---|---|---|---|---|---|---|
| | 6 | 9 | 12 | 18 | 24 | 36 | 48 | 54 |
| Time Allotted | $T_1$ | $1.5 T_1$ | $2 T_1$ | $3 T_1$ | $4 T_1$ | $5 T_1$ | $6 T_1$ | $6 T_1$ |

WTRU 18 may have data packets to communicate at a rate of 48 Mbps; WTRU 20 may have data packets to communicate at a rate of 12 Mbps; WTRU 22 may have data packets to communicate at a rate of 36 Mbps; WTRU 24 may have data packets to communicate at a rate of 6 Mbps; WTRU 26 may have data packets to communicate at a rate of 54 Mbps. In such a case, WTRU 18 would be allocated $3T_1$ to communicate data packets at its turn; WTRU 20 would be allocated $2T_1$ to communicate data packets at its turn; WTRU 22 would be allocated $5T_1$ to communicate data packets at its turn; WTRU 24 would be allocated $1T_1$ to communicate data packets at its turn; WTRU 26 would be allocated $6T_1$ to communicate data packets at its turn.

If, for example, WTRU 18 only used $2T_1$ to communicate its data packets at its turn, preferably the next WTRU would commence its turn for sending data packets. If, however, WTRU 18 required $5T_1$ to communicate its data packets, it would only be able to send a portion of those packets at a first turn, and would need to wait until its next turn before sending its remaining data packets.

One implementation of the invention for an AP is to have a memory configured with queues for packet data to be transmitted at each of the various rates. The AP can then transmit queued data packets to respective WTRUs by simply taking queued packets from each queue in a predefined sequence, where the number of packets transmitted for each queue's turn is based on the time allocated for the data rate associated with the queue.

For example for an AP serving 802.11(a) WTRUs, eight queues, one for each of the eight data rates can be provided. An AP scheduler operating in conjunction would repeatedly access each queue in a predefined sequence such as the lowest to highest rate queue, i.e. 6 Mbps queue, 9 Mbps queue, 12 Mbps queue, 18 Mbps queue, 24 Mbps queue, 36 Mbps queue, 48 Mbps queue, 54 Mbps queue. The access would be preferably configured to last up to the allotted time indicated for the particular service rate, i.e., $T_1$ for the 6 Mbps queue and $4 T_1$ for the 24 Mbps queue for the example provided in the table above. If, only $2T_1$ were required to communicate the data packets in the 24 Mbps queue at its turn, preferably the next turn for sending data packets from the 36 Mbps queue would commence without waiting for $4 T_1$ to expire. If, however, $5T_1$ were required to communicate the data packets in the 24 Mbps queue at its turn, the later queued packets would remain in the 24 Mbps queue until its next turn before they were sent. Where no packets are queued in a particular queue at its turn, that queue is preferably skipped for that turn.

Preferably, the scheduler is configured to limit the maximum allowed time in the queue permitted for QoS criteria for each respective service. However, the amount of time allocated for various rates can be varied to optimize the capacity of the network based on load or other criteria. For example, tracking the number of packets residing in each queue may be used to increase or decrease queue allocation times for each series of queue access turns. Accordingly, if tracking reflected no current packets in the 24 Mbps, 36 Mbps and 48 Mbps queues, the scheduler may be configured to then decide to double the access time allocated to each other queue for that series of turns.

Optimizing the overall AP Capacity/throughput by allocating more time to higher data rate services, by itself, can result in relatively large system and STA delays. Accordingly, in lieu of configuring the scheduler of an AP data packet transmitter to select packets from queues in a predefined queue access series, a scheduler may be provided that schedules packets based on a priority index value determined for queued packets.

Queue and scheduler configurations can be varied to accommodate different system designs and options. For example, the AP may be selectively configured depending upon whether or not the service requirements for data packets to be transmitted to STAs are known to the AP. In each case, the objective is for the scheduler to be configured in an attempt to optimize system throughput. Where possible, the scheduler preferably is configured with consideration of delay requirements for different services. Two examples are provided below for the case where a scheduler 30 is aware of Class-of-Service (CoS) information as reflected in FIG. 2 and the case where a scheduler 40 is unaware of Class-of-Service information as reflected in FIG. 3. In general, the respective schedulers 30, 40 comprise a respective memory device represented by the boxes and data blocks in FIGS. 2 and 3 and an associated processing device represented by the heavy arrows in FIGS. 2 and 3. For an 802.11 type of AP, the scheduler 30, 40 is typically situated to selectively release data packets to a MAC buffer for transmission processing, having received the data packets from higher layers of communication processing.

Figure 2:
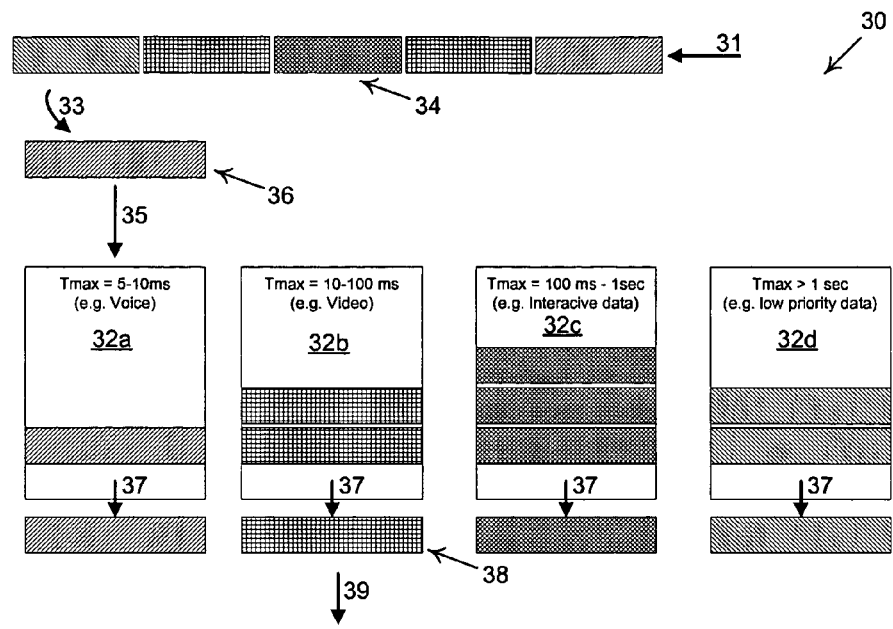
FIG. 2 is a schematic diagram of a queue system for a "Class of Service"-aware scheduler of an AP having queues allocated on a "Class of Service" basis.

With reference to FIG. 2, pre-classified traffic, i.e. data packets that are already classified according to their respective service requirements (e.g. CoS settings within IEEE 802.1D, IEE 802.1P or 802.1Q, etc), arrives at a transmission scheduler component 30 of an AP. In this case, the scheduler preferably has a transmission queue that is structured with a selected number of individual queues, each designated for data packets of a different type of service. For an example CoS aware case, the memory device is preferably configured with four individual queues 32a-32d to buffer data packets for voice, video, interactive data and low priority data, respectively. In FIG. 2, data packets are illustrated as appropriately distributed in each of the queues, the respective shading of the data packets representing its CoS.

Data packets arrive via a processing input 31 and are time stamped with an arrival time by a time stamping component 33 of the processing device. An input buffer 34 is preferably provided to the time stamping element 33. A distribution element 35 of the processing device queues each time stamped data packet into the tail of one of respective priority queues 32a-32d according to its service requirements. A voice data packet 36 is illustrated as being queued into the tail of the voice service queue 32a by distribution element 35.

The scheduler 30 contains a calculating component 37 that calculates a Priority Index of each packet at the head of each queue 32a-32d. A distribution output 39 of the scheduler 30, then sends the packet with the highest Priority Index on for transmission. FIG. 2 illustrates the case where the data packet at the head of the video queue 32b has been determined to have the highest priority so that the distribution output 39 is directing that packet 38 from the scheduler 30 for transmission.

Figure 3:
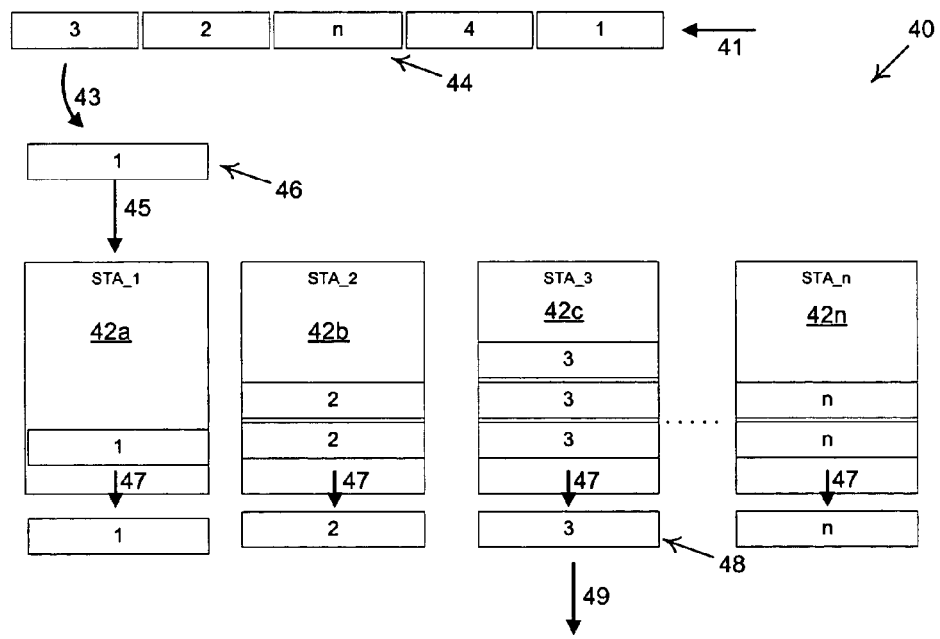
FIG. 3 is a schematic diagram of a queue system for a "Class of Service"-unaware scheduler of an AP having queues allocated on a STA basis.

With reference to FIG. 3, unclassified traffic, i.e. data packets that are not classified according service requirements, arrives at a transmission scheduler component 40 of an AP. In this case, the scheduler preferably has a transmission queue that is structured with individual queues that are each designated for data packets destined for a different STA. For this CoS unaware example, the memory device is preferably configured with individual queues 42a, 42b, 42c, . . . 42n to buffer data packets for each STA, STA_1, STA_2, STA_3, . . . STA_n, respectively, to which the AP is sending data. In the CoS unaware scenario, the queue structure is preferably continually adjusted to provide for additional queues for STAs commencing data communications and eliminating queues for STAs that have terminated data communications. In FIG. 3, data packets are illustrated as appropriately distributed in each of the queues and marked with a number representing their respective destination STA.

Data packets arrive via a processing input 41 and are time stamped with an arrival time by a time stamping component 43 of the processing device. An input buffer 44 is preferably provided to the time stamping element 43. A distribution element 45 of the processing device queues each time stamped data packet into the tail of one of respective priority queues 42a, 42b, 42c, . . . 42n according to its destination. A data packet 46 destined for STA_1 is illustrated as being queued into the tail of the STA_1 queue 42a by distribution element 45.

The scheduler 40 contains a calculating component 47 that calculates a Priority Index of each packet at the head of each queue 42a, 42b, 42c, . . . 42n. A distribution output 49 of the scheduler 40, then sends the packet with the highest Priority Index on for transmission. FIG. 3 illustrates the case where the data packet at the head of the STA_3 queue 42c has been determined to have the highest priority so that the distribution output 49 is directing that packet 48 from the scheduler 40 for transmission.

Preferably, the calculating component 37, 47 calculates the Priority Index for each data packet based in part on both data rate and waiting time. A standard rate control algorithm is preferably used to determine the data rate. Waiting time for each packet in the queue is preferably determined based on a current time value minus the stamped arrival time.

Two preferred variations of the calculations of the Priority Index are provided by the following equations:

$$\text{PriorityIndex} = [\alpha \times \text{DataRateIndex}] + [(1-\alpha) \times \text{DelayIndex}]$$

or $$\text{PriorityIndex} = \alpha \times \text{DataRateIndex} \times \text{DelayIndex}$$

where: $\alpha$ is a weight factor to give higher priority to specific classes, $$\text{DataRateIndex} = \frac{\text{CurrentTransmissionDataRate}}{\text{MaxDataRate}}, \text{ and}$$

$$\text{DelayIndex} = \frac{\text{WaitingTime}}{T\max}.$$

The weight factor $\alpha$ can be set differently per priority queue to give higher priority to one class or one STA over the other. The weight factor $\alpha$ can be set to zero or a small number to achieve maximum capacity. The weight factor $\alpha$ can be set to value bigger than 1 to achieve the best QoS performance.

CurrentTransmissionDataRate is the rate at which the AP is then using to transmit data. MaxDataRate is the maximum system specified rate, e.g., for 802.11b, it is 11 Mbps as reflected in Table 1 above.

Tmax is a value for maximum allowed queuing. Tmax can be set per priority queue in the case of the CoS aware scenario. For example, for the queues 32a-d illustrated in the example of FIG. 2, Tmax for the voice queue 32a is preferably set in a range of 5 to 10 ms; Tmax for the video queue 32b is preferably set in a range of 10 to 100 ms; Tmax for the interactive data queue 32c is preferably set in a range of 100 ms to 1 second; and Tmax for the low priority data queue 32d is preferably set in at a value greater than 1 second. In case of the CoS unaware scenario of FIG. 3, the AP preferably has one value for Tmax to limit the maximum delay in the whole system.

In some cases, the AP may be dynamically configured to support different sets of data rates at different times. In those instances, the queue allocation of a CoS aware scheduler may be dynamically adjusted in accordance with the set of data rates which are currently in effect at the AP. For example, a combined 802.11b/802.11g system may have APs configured to dynamically select between operating in a mode supporting only the 802.11b data rates and a mode supporting the more inclusive set of 802.11g data rates. Preferably, the APs are capable of switching between these two modes and advertising which rates are currently supported.

As can be seen from Tables 3 and 4, for rates of 12 Mpbs or lower, it is possible to choose either an 802.11g rate or an 802.11b rate for the same environment. The chosen rate is preferably selected to allow fairness between 802.11b and 802.11g devices and to maximize the usable throughput. Fairness is of interest where there is an existing installed base of 802.11b devices and it is desired that the introduction of 802.11g does not noticeably degrade 802.11b performance.

The decision to use slower 802.11b rates over 802.11g rates in the interest of fairness preferably is made to depend on the number of pure 802.11b devices, the number of 802.11g devices, and the signal quality of those devices. For example, if there are ten (10) 802.11g devices all operating at or below 12 Mbps, and only one (1) 802.11b device, the channel throughput gains exceed the performance degradations of the 802.11b device. If there are devices operating and capable of 54 Mbps performance, it is not advantageous to force the system to operate exclusively in the 802.11b mode.

Tables 3 and 4 below show the rates for 802.11b and 802.11g, as well as the usable throughput, and the time required to send a 1500 byte packet.

TABLE 3

802.11b Rate Characteristics Comparison.

| 802.11b Rate (Mbps) | Modulation Scheme | Example Receiver Sensitivity (dBm) | Usable Throughput (Mbps) | Time to send one 1500-byte packet (microseconds) |
|---|---|---|---|---|
| 11 | 8-bit CCK/DQPSK | −85 | 7.43 | 1615 |
| 5.5 | 4-bit CCK/DQPSK | −88 | 4.4 | 2731 |
| 2 | DQPSK | −91 | 1.8 | 6636 |
| 1 | DBPSK | −94 | 0.9 | 12828 |

With reference to Table 4, if the system has only 802.11g devices, the usable throughput is shown in the 4$^{th}$ column. In the presence of any 802.11b devices, the usable throughput drops and is shown in the 5$^{th}$ column.

Figure 4:
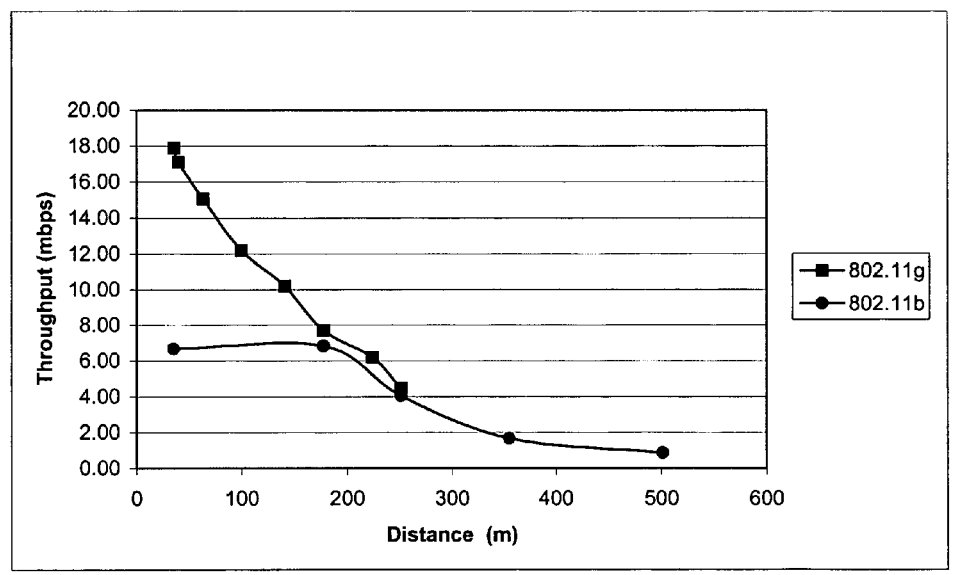
FIG. 4 is a plot showing the effective throughput versus distance for a free space path loss model that compares 802.11b and 802.11g devices.

Based on the above examples of receiver sensitivities, and using a free Space Path loss model, an example of a throughput vs. range curve is shown in FIG. 4. It can be seen from FIG. 4 that the smaller the distance between the receiver and transmitter, the higher the effective throughput. FIG. 4 also shows that the 802.11g rates provide a greater throughput for the same range as compared with 802.11b devices. As illustrated, the throughputs converge as the distance approaches approximately 250 meters. FIG. 4 represents an example in a noise-limited system. For a system with different receiver sensitivities, the ranges would different.

Figure 5:
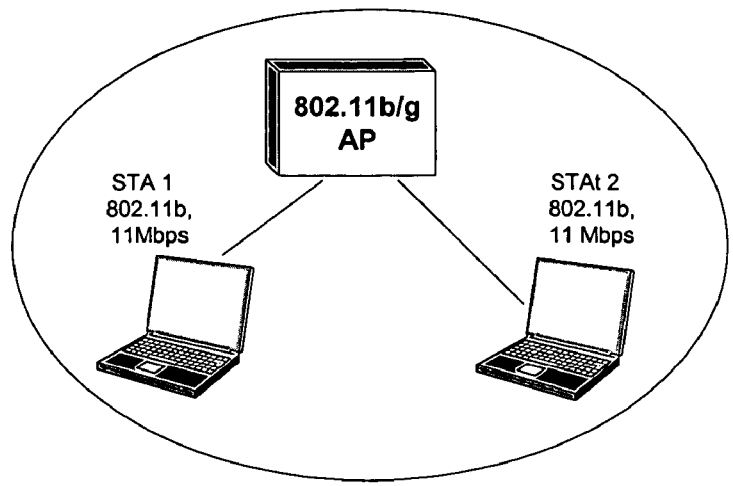
FIG. 5 is a diagram illustrating a WLAN comprised of 802.11b STAs communicating with an 802.11b/802.11g compatible AP with an accompanying example of data transmission sequence.
Figure 5:

FIG. 5 illustrates a system composed of an AP and two 802.11b clients, i.e., STAs, STA 1 and STA 2, and shows a data packet transmission of each STA reflecting equality of access. Each STA transmission (i.e., STA 1 and STA 2) is followed by an acknowledge (ACK) frame from the AP.

Figure 6:
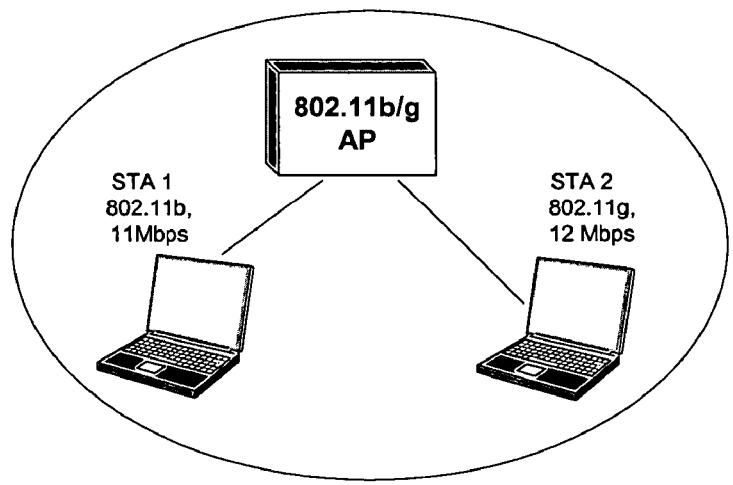
FIG. 6 is a diagram illustrating a WLAN comprised of an 802.11b STA and an 802.11g STA communicating with an 802.11b/802.11g compatible AP with an accompanying example of data transmission sequence.
Figure 6:
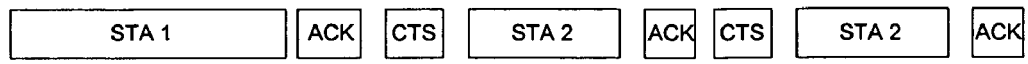

FIG. 6 shows the same system as FIG. 5, but with one of the 802.11b devices, STA 2, replaced by an 802.11g device. FIG. 6 illustrates a data packet transmission of the STA reflecting inequality of access, the STA 2 802.11g device having twice the access. Each STA transmission (i.e., STA 1 and STA 2) is followed by an acknowledge (ACK) frame from the AP. The STA 2 transmissions are preceded by a clear to send (CTS) frame, which is required for co-existence.

The throughputs for STA 1 and STA 2 for the FIG. 5 when both STAs are 802.11b stations operating at 11 Mbps example can be calculated as follows:

$$\text{Throughput} = (\text{Data sent per cycle})/(\text{Time per cycle})$$

$$= (2 * 1500 \text{ bytes})/(2 * 1615 \text{ microseconds})$$

$$= 7.4 \text{ Mbps channel throughput (i.e. } 3.71 \text{ Mbps}$$

$$\text{for each } STA).$$

TABLE 4

802.11g Rate Characteristics Comparison

| 802.11g Rate (Mbps) | Modulation Scheme | Example Receiver Sensitivity (dBm) | Usable Throughput (802.11g only system) | Usable Throughput (Combined 802.11b and 802.11g system) | Time to send one 1500 byte packets (Combined system) (microseconds) |
|---|---|---|---|---|---|
| 54 | 64 QAM, 3/4 | −71 | 36.4 | 19.9 | 603 |
| 48 | 64 QAM, 2/3 | −72 | 33.5 | 19 | 632 |
| 36 | 16-QAM, 3/4 | −76 | 27.1 | 16.7 | 717 |
| 24 | 16-QAM, 1/2 | −80 | 19.6 | 13.5 | 887 |
| 18 | QPSK, 3/4 | −83 | 15.3 | 11.3 | 1058 |
| 12 | QPSK, 1/2 | −85 | 10.7 | 8.6 | 1401 |
| 9 | BPSK, 3/4 | −87 | 8.2 | 6.9 | 1744 |
| 6 | BPSK, 1/2 | −88 | 5.6 | 4.9 | 2430 |

For the FIG. 6 example where STA 2 functions as an 802.11g device operating at 12 Mbps, the throughput calculations are:

Throughput = (Data sent per cycle)/(Time per cycle)

= (1500 + 2 * 1500 bytes)/(1615 + 2 * 1401 microseconds)

= 8.15 Mbps channel throughput (i.e. 2.72 Mpbs for 802.11b STA 1 and 5.43 Mbps for 802.11g STA 2).

As reflected in FIG. 6, the 802.11g device, STA 2 gets on average double the access opportunities. Although the channel throughput has increased from 7.4 to 8.15 Mbps (10%), the throughput for the 802.11b device has decreased 27%.

Similarly, for two (2) 802.11b devices operating at 5.5 Mbps, the throughput is:

Throughput = (Data sent per cycle)/(Time per cycle)

= (2 * 1500 bytes)/(2 * 2731 microseconds)

= 4.4 Mbps channel throughput (i.e. 2.2 Mbps for each STA).

Comparatively, for one 802.11b device operating at 5.5 Mbps, and one 802.11g device operating at 6 Mbps, the throughput is:

Throughput = (Data sent per cycle)/(Time per cycle)

= (1500 + 2 * 1500 bytes)/2731 + 2 * 2430 microseconds)

= 4.8 Mbps channel throughput (i.e. 1.6 Mbps for 802.11b STA 1 and 3.2 Mbps for 802.11g STA 2).

In this latter comparison, the channel throughput increase is from 4.4 to 4.8 Mbps (9%), but the drop in throughput for the 802.11b device is 27%.

In these two comparisons, it is seen that while there is an increase in the channel throughput when the 802.11g mode is used for STA 2 as opposed to the 802.11b mode, there is a substantial decrease in the performance of the 802.11b device.

A further comparative example illustrates the lack of fairness when the channel quality is extremely poor, e.g. due to high interference, such that the 1 Mbps rate is chosen. Normally, as long as an AP advertises that it supports 802.11g rates, the 802.11g devices use a smaller contention window, even when operating at 802.11b rates.

For two (2) 802.11b devices, one operating at 11 Mbps, and the other at 1 Mbps, the throughput is:

Throughput = (Data sent per cycle)/(Time per cycle)

= (2 * 1500 bytes)/(1615 + 12828 microseconds)

= 1.66 Mbps channel throughput (i.e. 0.83 Mbps for each STA).

Comparatively, for one 802.11b device operating at 11 Mbps, and one 802.11g device operating at 1 Mbps, the throughput is:

Throughput = (Data sent per cycle)/(Time per cycle)

= (1500 + 2 * 1500 bytes)/(1615 + 2 * 12828 microseconds)

= 1.32 Mbps channel throughput (i.e. 0.44 Mbps for 802.11b STA 1 and 0.89 Mbps for 802.11g STA 2).

In this third comparison, the 802.11b device throughput decreases by 53%, and additionally, there is a decrease in the channel throughput due to the slower 802.11g device occupying the channel for longer periods.

Figure 7:
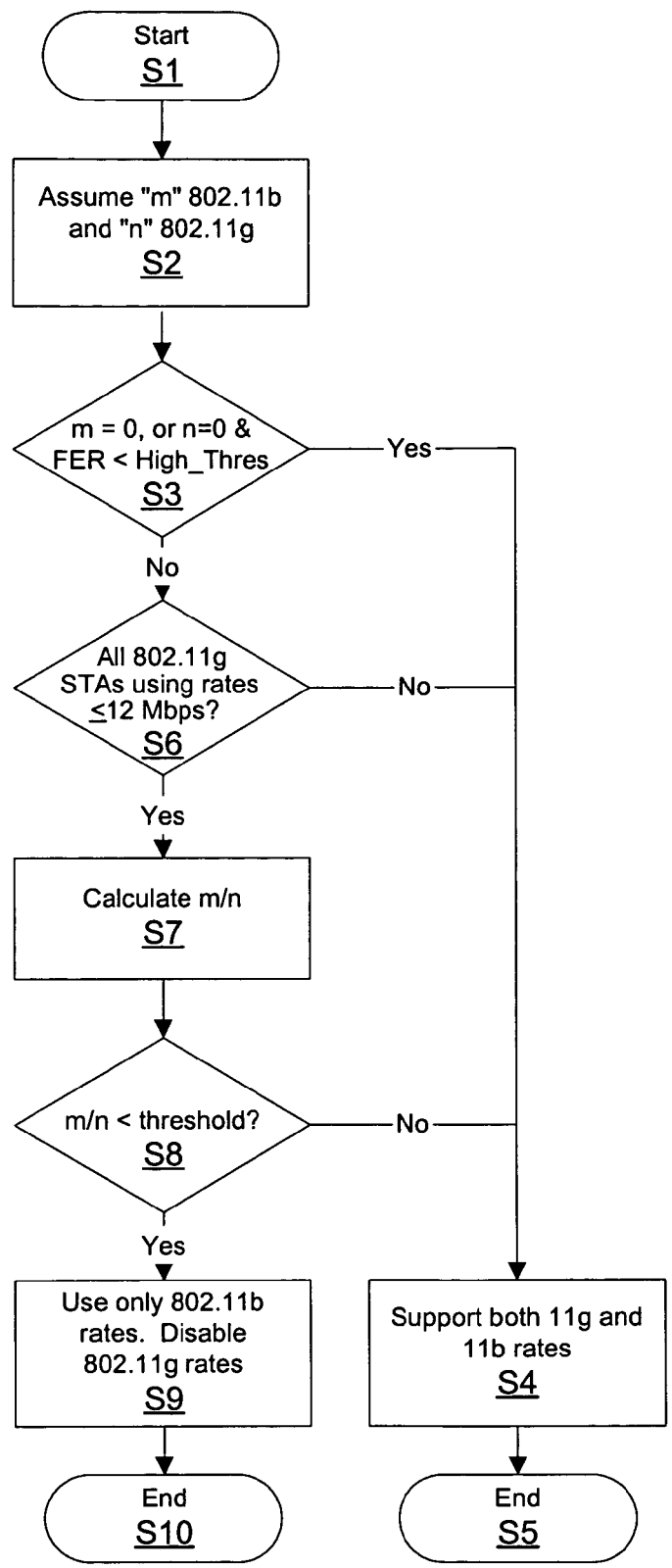
FIG. 7 is a flow diagram showing method steps for choosing bit transmission rate(s) based on the number of 802.11b and 802.11g STAs, the signal quality of these devices and fairness.

FIG. 7 illustrates a procedure that can be implemented by an AP processor to determine what rates are advertised via the AP's transmitter. Generally, when a system has devices that are all 802.11g or where the frame error rate (FER) is below a given threshold, then all rates are supported. When the system has only 802.11b devices, it is still of interest to advertise support of 802.11g rates, in the case that an 802.11g device begins to operate at a high rate (i.e., at a rate above the range of 802.11b devices). When the frame error rate (FER) is below a given threshold which indicates that the channel quality is good, and 802.11g devices should not be restricted from using higher rates, if possible.

For the preferred process shown in FIG. 7, at step S1 the process is started when a change in the number of STAs or in the FER is detected. At step S2 variables m and n are assigned the number of 802.11b and 802.11g STAs, respectively, that are communicating with the AP. At step S3, a determination is made if all STAs are 802.11g, i.e. no 802.11b STAs, m=0, or if FER is below a selected threshold High_Thres. If either is the case, at step S4, all rates are supported and the process ends, step S5.

If not, a determination is made at step S6 whether the system has any 802.11g devices using rates above 12 Mbps. If not, then both 802.11g and 802.11b device rates are supported, step S4. When 802.11b devices are present, and all 802.11g devices are operating at or below 12 Mbps, S6, (e.g., due to a high interference environment), the decision about whether to eliminate support of the 802.11g mode is determined by ascertaining the relative number of 802.11b devices (m) and 802.11g devices (n) in steps S7, S8. The ratio is calculated in step S7 and a determination is made in step S8. When m/n is less than a given threshold, 802.11g rates are disabled are in step S9 and the process ends step S10. When the ratio of 802.11b devices to 802.11g devices (m/n) is greater than the threshold, both the 802.11g and the 802.11b rates are supported, step S4.

This method is particularly applicable in situations where the high modulation rates would not be used, e.g. in a system where interference is high, or where all devices are located at large distances from the AP.

The preferred measures taken to ensure backward compatibility to existing 802.11b devices with the introduction of 802.11g devices include:

In the presence of any 802.11b client devices (STA), prior to any transmission, all 802.11g devices inform the 802.11b devices of the impending transmission. This is accomplished by transmitting a Clear-to-send frame (CTS-to-self). The effect of this additional CTS frame is a reduction in effective throughput for 802.11g (see Table 4, columns 4 and 5).

In terms of access to the radio channel, all existing 802.11 systems preferably use a random backoff timer in order to determine when to attempt a transmission. The choice of the random number is preferably between [0,31] for 802.11b, and [0,15] for 802.11g. The reason for the difference in the range of the backoff values for 802.11b and 802.11g systems is to give 802.11g devices, which presumably operate at a higher rate, a higher probability of accessing the channel, so that the channel is used more efficiently. The effect of this is that 802.11g devices typically get twice the transmission opportunities of 802.11b devices. As long as the AP advertises that it supports the 802.11g rates, the 802.11g devices will always use the smaller contention window, even when operating at an 802.11b rate.

Preferably, the components the WTRU's scheduler are implemented on an single integrated circuit, such as an application specific integrated circuit (ASIC). Similarly, the receiving unit, the signal processing unit and the transmitting unit of a rate advertising WTRU can be implemented on an ASIC. However, in either case, the components may also be readily implemented on multiple separate integrated circuits.

The foregoing description makes references to 802.11 type systems as an example only and not as a limitation. Other variations and modifications consistent with the invention will be recognized by those of ordinary skill in the art.

What is claimed is:

1. A wireless transmit/receive unit (WTRU) for conducting wireless communications with a plurality of other WTRUs that implements a process for controlling transmission of wireless communication data to the other WTRUs comprising:

a scheduler configured to queue data packets for transmission to other WTRUs based on a transmission rate of the packets and to selectively enable transmission of queued data packets from transmission rate assigned queues in successive turns based on an allocated time period for each queue turn such that a shortest time period is allocated for data packets queued in a lowest transmission rate queue and a longest time period is allocated for data packets queued in a highest transmission rate queue.

2. The WTRU of claim 1 wherein the scheduler is configured to allocate a time period for a given queue that is at least as long as the time period allocated for each queue assigned for data packets designated for transmission at a lower transmission rate than the transmission rate assigned to the given queue.

3. The WTRU of claim 1 configured as an Access Point (AP) for a 802.11 wireless local area network (WLAN).

4. The WTRU of claim 1 wherein the scheduler is implemented in an application specific integrated circuit (ASIC).

5. A wireless transmit/receive unit (WTRU) for conducting wireless communications with a plurality of other WTRUs that implements a process for controlling communication of wireless communication data with the other WTRUs comprising:

a scheduler configured to selectively enable communication of data packets with other WTRUs in successive turns based on an allocated time period for each turn such that a shortest time period is allocated for data packets communicated at a lowest transmission rate and a longest time period is allocated for data packets communicated at a highest transmission rate.

6. The WTRU of claim 5 wherein the scheduler is configured to allocate time periods for receiving data packets from other WTRUs such that each other WTRU is provided a transmission time for its respective turn based upon the transmission rate at which that WTRU is to transmit data packets that is at least as long as the time period allocated for data packets designated for transmission at a lower transmission rate than the transmission rate at which that WTRU is to transmit data packets.

7. The WTRU of claim 6 wherein the scheduler is configured to queue data packets for transmission to other WTRUs based on transmission rate and to selectively enable transmission of queued data packets from transmission rate assigned queues in successive turns based on an allocated time period for each queue turn such that a shortest time period is allocated for data packets queued in a lowest transmission rate queue and a longest time period is allocated for data packets queued in a highest transmission rate queue.

8. The WTRU of claim 7 wherein the scheduler is configured to allocate a time period for a given queue that is at least as tong as the time period allocated for each queue assigned for data packets designated for transmission at a lower transmission rate than the transmission rate assigned to the given queue.

9. The WTRU of claim 8 configured as an Access Point (AP) for a 802.11 wireless local area network (WLAN).

10. The WTRU of claim 8 wherein the scheduler is implemented in an application specific integrated circuit (ASIC).

11. A method for conducting wireless communication of data between a wireless transmit/receive unit (WTRU) and a plurality of other WTRUs and for controlling transmission of such data to the other WTRUs comprising:

queuing data packets for transmission to other WTRUs based on transmission rate wherein there are multiple queues, each queue holding packets for transmission at a single transmission rate; and selectively enabling transmission of queued data packets from transmission rate assigned queues in successive turns based on an allocated time period for each queue turn such that a shortest time period is allocated for data packets queued in a lowest transmission rate queue and a longest time period is allocated for data packets queued in a highest transmission rate queue.

12. The method of claim 11 wherein a time period is allocated for a given queue that is at least as long as the time period allocated for each queue assigned for data packets designated for transmission at a lower transmission rate than the transmission rate assigned to the given queue.

13. The method of claim 11 wherein the method is conducted by a WTRU configured as an Access Point (AP) for a 802.11 wireless local area network (WLAN).

14. A method for conducting wireless data communication between a wireless transmit/receive unit (WTRU) and a plurality of other WTRUs that implements a process for controlling data communication with the other WTRUs comprising:

selectively enabling communication of data packets with other WTRUs in successive turns based on an allocated time period for each turn such that a shortest time period is allocated for data packets communicated at a lowest transmission rate and a longest time period is allocated for data packets communicated at a highest transmission rate.

15. The method of claim 14 wherein time periods are allocated for receiving data packets from other WTRUs such that each other WTRU is provided a transmission time for its respective turn based upon the transmission rate at which that WTRU is to transmit data packets that is at least as long as the time period allocated for data packets designated for transmission at a lower transmission rate than the transmission rate at which that WTRU is to transmit data packets.

16. The method of claim 15 wherein data packets are queued for transmission to other WTRUs based on transmission rate and transmission of queued data packets is selectively enabled from transmission rate assigned queues in successive turns based on an allocated time period for each queue turn such that a shortest time period is allocated for data packets queued in a lowest transmission rate queue and a longest time period is allocated for data packets queued in a highest transmission rate queue.

17. The method of claim 16 wherein a time period is allocated for a given queue that is at least as long as the time period allocated for each queue assigned for data packets designated for transmission at a lower transmission rate than the transmission rate assigned to the given queue.

18. The method of claim 17 wherein the method is conducted by a WTRU configured as an Access Point (AP) for a 802.11 wireless local area network (WLAN).

* * * * *

UNITED STATES PATENT AND TRADEMARK OFFICE
CERTIFICATE OF CORRECTION

| | | |
|---|---|---|
| PATENT NO. | : 7,656,899 B2 | Page 1 of 1 |
| APPLICATION NO. | : 10/933008 | |
| DATED | : February 2, 2010 | |
| INVENTOR(S) | : Arty Chandra | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1221 days.

Signed and Sealed this

Thirtieth Day of November, 2010

David J. Kappos
*Director of the United States Patent and Trademark Office*